(12) United States Patent
Durham et al.

(10) Patent No.: US 9,299,331 B1
(45) Date of Patent: Mar. 29, 2016

(54) TECHNIQUES FOR SELECTING MUSICAL CONTENT FOR PLAYBACK

(71) Applicant: Amazon Technologies, Inc., Reno, NV (US)

(72) Inventors: Brandon Scott Durham, Seattle, WA (US); Sarvesh Chandra Regmi, Redwood City, CA (US); Vladimir Lazebny, Seattle, WA (US); Joshua Fredrick Lutes, Seattle, WA (US); Darren Levi Malek, Seattle, WA (US); Haowei Lu, Seattle, WA (US); Christopher Woolf Phillips, Berkeley, CA (US); Kintan Dilipkumar Brahmbhatt, San Francisco, CA (US); Toby Ray Latin-Stoermer, Seattle, WA (US); Gabriela Ahern, Seattle, WA (US); William Jarred Leslie, Seattle, WA (US); Xinjie Di, Bellevue, WA (US); Benjamin Lee Shepherd, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 198 days.

(21) Appl. No.: 14/103,444

(22) Filed: Dec. 11, 2013

(51) Int. Cl.
*G10H 7/00* (2006.01)
*G06F 17/30* (2006.01)
*H04N 21/262* (2011.01)

(52) U.S. Cl.
CPC .......... *G10H 7/00* (2013.01); *G06F 17/30772* (2013.01); *H04N 21/26258* (2013.01)

(58) Field of Classification Search
CPC ............... G06F 17/30772; G06F 17/30743; H04N 21/26258; H04N 21/8113
See application file for complete search history.

(56) References Cited

U.S. PATENT DOCUMENTS

| | | | |
|---|---|---|---|
| 7,003,515 B1 * | 2/2006 | Glaser et al. | 707/723 |
| 8,694,666 B2 * | 4/2014 | Dixon | 709/231 |
| 8,700,795 B2 * | 4/2014 | Boulter et al. | 709/231 |
| 2006/0112810 A1 * | 6/2006 | Eves et al. | 84/609 |
| 2006/0206478 A1 * | 9/2006 | Glaser et al. | 707/5 |
| 2011/0196867 A1 * | 8/2011 | Hyman | 707/737 |
| 2012/0290621 A1 * | 11/2012 | Heitz et al. | 707/780 |
| 2014/0074861 A1 * | 3/2014 | Bieschke et al. | 707/748 |
| 2014/0229894 A1 * | 8/2014 | Vinna et al. | 715/810 |
| 2014/0277638 A1 * | 9/2014 | Smith | 700/94 |

OTHER PUBLICATIONS

Baluja, Shumeet; et al. "Video Suggestion and Discovery for YouTube: Taking Random Walks Through the View Graph," International World Wide Web Conference, Apr. 2008.
Page, Kevin R.; et al."Reuse, Remix, Repeat: The Workflows of Mir," 13th International Society of Music Information Retrieval Conference, 2012, pp. 409-414.

* cited by examiner

*Primary Examiner* — Jeffrey Donels
(74) *Attorney, Agent, or Firm* — Weaver Austin Villeneuve & Sampson LLP (57) ABSTRACT

Techniques are described for automatically selecting musical content for playback based on an initial "seed" of music selected by a user in a way that seamlessly extends the user's listening experience. The initially selected seed music might be, for example, an album or a playlist. Music that follows the seed music is algorithmically selected to match the music selected by the user.

20 Claims, 4 Drawing Sheets

TECHNIQUES FOR SELECTING MUSICAL CONTENT FOR PLAYBACK

BACKGROUND

Consumers have an ever-increasing array of options for listening to digital music, both in terms of the number of content providers, as well as the variety of channels and devices through which music may be accessed. Content providers are becoming increasingly sophisticated and effective at providing access to vast amounts of musical content on demand, as well as identifying specific musical content that might be of interest to individual users. Success in the marketplace will depend in part on the ability of content providers and providers of products that play digital music to continue to provide new and convenient mechanisms for consumers to discover and consume musical content.

DETAILED DESCRIPTION

This disclosure describes techniques for automatically selecting musical content for playback based on an initial "seed" of music selected by a user in a way that seamlessly extends the user's listening experience. The initially selected seed music might be, for example, an album or a playlist. Music that follows the seed music is algorithmically selected to match the music selected by the user and may also be personalized based on preferences, characteristics, or behavior of the user.

Figure 1:
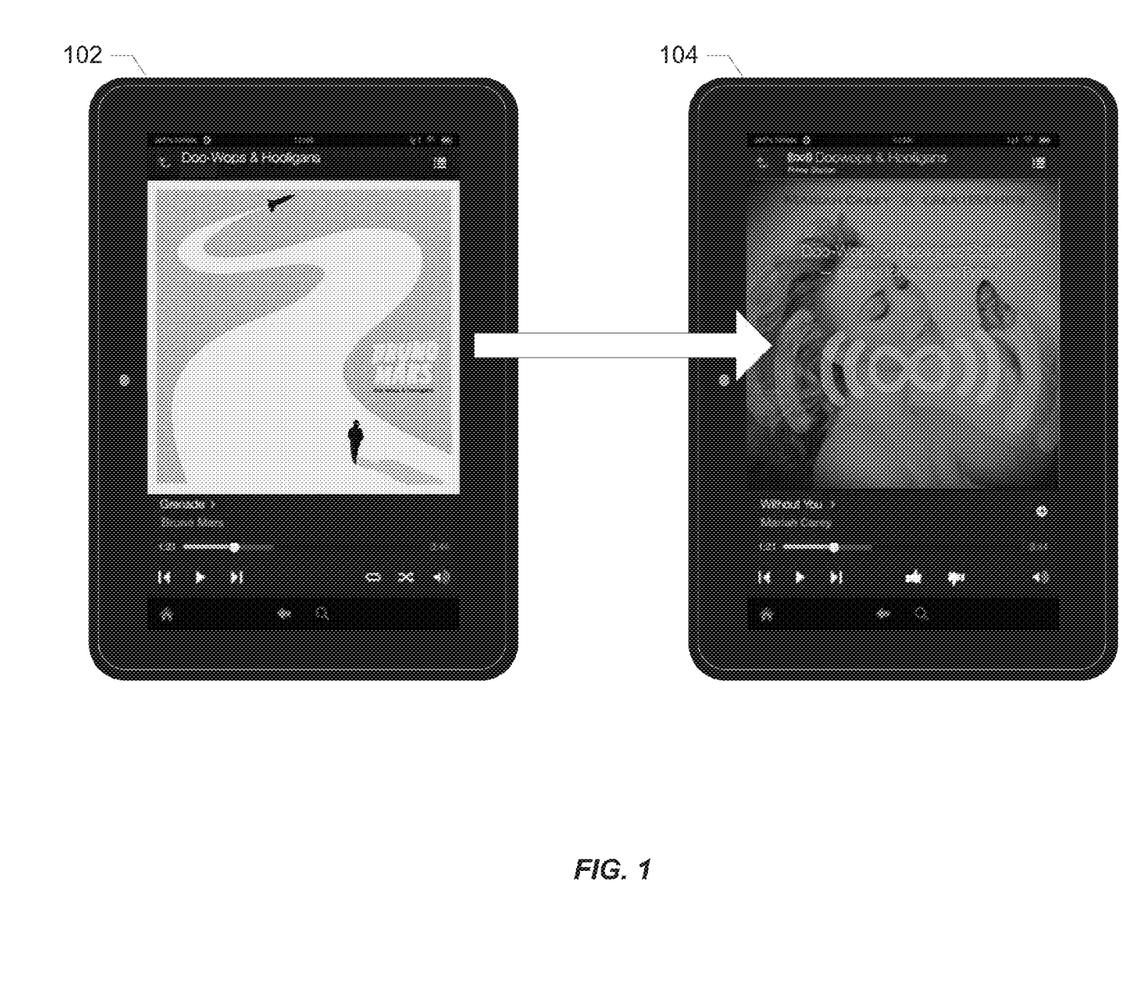
FIG. 1 shows interfaces illustrating operation of a process for selecting and delivering digital music.

For example, as shown in FIG. 1, a Kindle Fire user might select the entire album "Doo-Wops & Hooligans" by Bruno Mars from her music library for playback using the Amazon Cloud Player. This results in playback of all twelve tracks of that album. When the last of the twelve tracks completes (102), instead of the music stopping, the player automatically begins playback of music selected to match the user-selected seed music. This might result, for example, in playback of the Mariah Carey track "Without You" following the last Bruno Mars track (104). This, in turn, is followed by a continuing succession of musical selections that faithfully maintain the user's experience without requiring anything of the user. The automatic selection and playback of music consistent with the seed music continues until paused or otherwise terminated by the user.

This "Music Never Stops" (MNS) music service may be thought as a combination of an ownership model in which the user controls what she wants to listen to, and a discovery model that delivers great music directed to the tastes of the user. So, for example, if the user wants to relax, she can select a set of tracks that she knows will evoke that mood for her, and then can trust the MNS service to take over and extend that experience without any additional work on her part. The MNS service may also be particularly well suited for situations in which the user is driving or engaged in some other activity that should not be interrupted.

Figure 2:
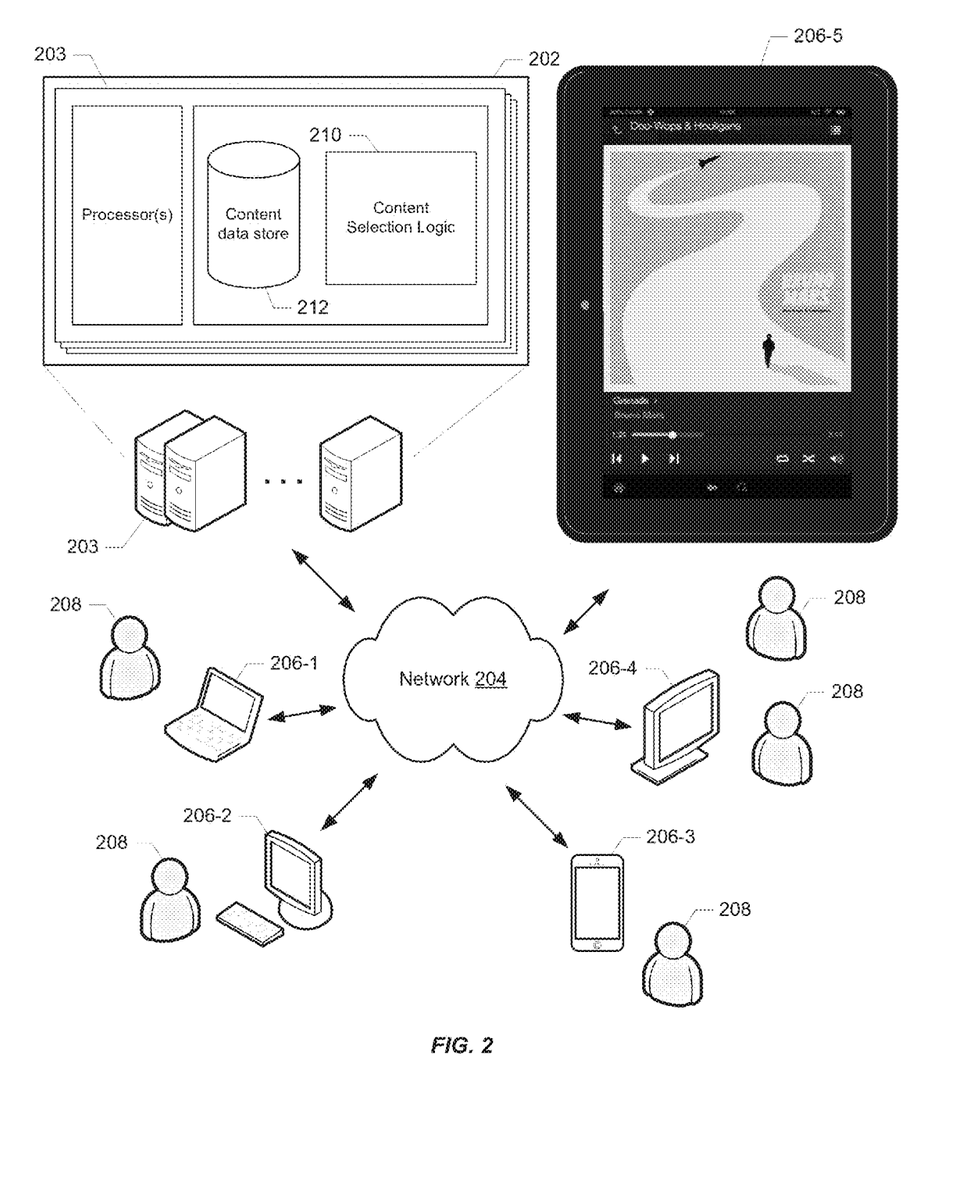
FIG. 2 illustrates an example of a computing environment in which digital music may be delivered.

FIG. 2 illustrates an example of a computing environment in which musical experiences can be extended as described herein in conjunction with use of an MNS service 202 via network 204 by a variety of client devices (206-1 through 206-5) associated with users 208. MNS service 202 may conform to any of a wide variety of architectures such as, for example, a services platform deployed at one or more co-locations, each implemented with one or more servers 203. Network 204 represents any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Client devices 206 may be any suitable device capable of connecting to network 204 and consuming services provided by service 202. Such devices may include, for example, mobile devices (e.g., cell phones, smart phones, and tablets), personal computers (e.g., laptops and desktops), set top boxes (e.g., for cable and satellite systems), smart televisions, gaming consoles, wearable computing devices, etc. In addition, at least some of the examples described herein contemplate various distributed computing implementations based on computing models that enable ubiquitous, convenient, on-demand network access to a shared pool of computing resources (e.g., networks, servers, storage, applications, and services).

It should also be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular protocols herein are merely by way of example. Suitable alternatives known to those of skill in the art may be employed.

MNS service 202 may be integrated with, for example, a musical content service with which users may discover and consume musical content. As with conventional services, this enhanced service may include various types of logic and provide interfaces with which users may search for and download or connect with musical content (not shown for clarity). In addition, service 202 includes music selection logic 210 configured to select musical content (represented in associated data store 212) for playback in response to selection of seed music as described herein. It should be noted that, while music selection logic 210 and data store 212 are contemplated as part of a musical content service, implementations are contemplated in which either or both operate remotely from musical content service, and/or either or both are under the control of an independent entity. Implementations are also contemplated in which some or all of the functionality of music selection logic 210 and/or at least some of the musical content (e.g., the user-selected seed music) is implemented and/or stored on client device (e.g., device 206-5.)

Figure 3:
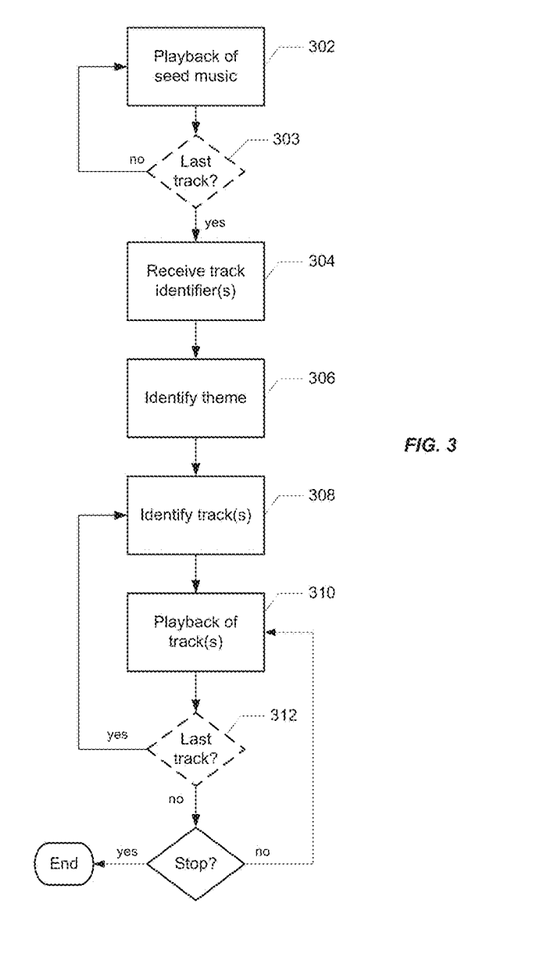
FIG. 3 illustrates an example of a process for selecting and delivering digital music.
Figure 4:
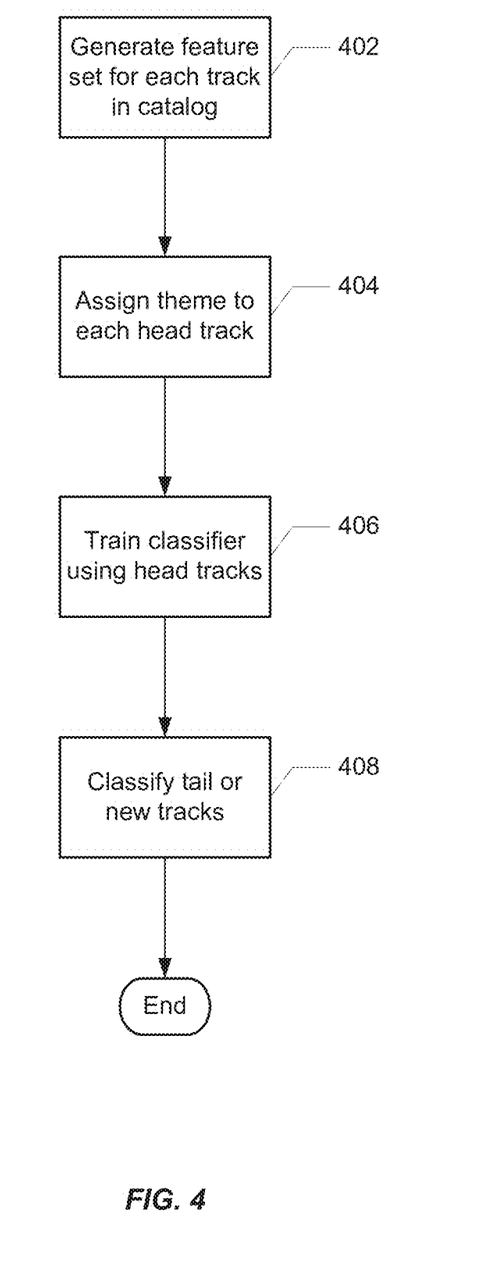
FIG. 4 illustrates an example of a process for classifying digital music.

A specific implementation will now be described with reference to the computing environment of FIG. 2 and the flow diagrams of FIGS. 3 and 4. In the depicted implementation, a user initiates playback of seed music (302) by selecting the seed music using an interface of a music player such as, for example, the Amazon Cloud Player. The seed music may be, for example, a track, an album, or a playlist. The seed music may be identified directly (e.g., by selection of the track, album, or playlist), or indirectly (e.g., by selection of an artist or a genre). The track(s) of the seed music may be stored on the user's device or a storage device under control of the user, or may be stored on a remote server, e.g., as part of a hosted music service (e.g., in data store 212). The rights to the selected seed music may or may not be entirely owned by the user. Suitable variations and combinations of these variants will be apparent to those of skill in the art.

During playback of the seed music one or more identifiers associated with the seed music are received by content selection logic, e.g., logic 210 (304). This may be initiated, for example, by the music player on the client (e.g., 206-5) making a program call to MNS application programming interfaces (APIs) of a back-end music service (e.g., 202) with which the identifiers are provided. The identifiers correspond to and specifically identify each of the tracks in the seed music and may be, for example, proprietary identifiers associated with the music service from which the tracks were purchased, downloaded, streamed, etc. Alternatively, the identifiers may be determined with reference to metadata associated with each track. As yet another alternative, the identifiers may be determined by comparing a digital signature of each track to a library of digital signatures.

The identifiers may be transmitted by the music player to the remote platform on which the content selection logic resides, or identified or generated locally by the music service, at any time during playback of the seed music. However, it may be advantageous to wait until the last track of the seed music is playing (303) before initiating identification of further tracks, i.e., MNS tracks, to be played. That is, the continuity of the user's listening experience may depend on an accurate determination of a theme that is represented by the seed music. Therefore it may be important to wait until playback of the final track of the seed music begins to account for situations in which the user skips tracks or adds tracks to the end of her queue; actions which may be important indicators as to the precise theme the user is trying to create.

The content selection logic identifies a theme that best represents the tracks of the seed music (306). That is, each of the tracks of the seed music and each of the tracks in the catalog (e.g., stored in data store 212) have one or more corresponding themes which, on first impression, may appear analogous to conventional music categories or genres but which differ in some important respects. As used herein, "theme" refers to a set of classification labels or features applied to algorithmically clustered tracks in which the clustering is based, at least in part, on extracted characteristics of the music. A theme might represent, for example, a mood the user is trying to set and/or a genre representative of the seed music but may be more generally characterized as representing a coherent, contextually consistent musical experience. The manner in which themes may be assigned to tracks in a catalog may be understood with reference to the example depicted in FIG. 4.

According to a particular class of implementations, a set of features is generated for each track in the catalog (402). The set of features for each track includes a set of extracted features that represent characteristics of the music itself with numerical values. For example, musical characteristics such as timbre, pitch, rhythm, tempo, instrumentation, etc., may be represented. According to a particular subset of these implementations, feature extraction is accomplished using the open-source Music Analysis, Retrieval and SYnthesis for Audio Signals (MARSYAS) library as described, for example, in *Reuse, Remix, Repeat: The Workflows of MIR* by Kevin R. Page, Ben Fields, David De Roure, Tim Crawford and J. Stephen Downie, 13th International Society for Music Information Retrieval Conference (ISMIR 2012), the entirety of which is incorporated herein by reference for all purposes. However, it should be noted that the extraction of features from tracks may be done using any of a wide variety of tools that can measure or represent various aspects or qualities of the musical content represented in a track.

The feature set for each track may also include a variety of other features derived from a variety of sources. For example, tracks typically have a variety of associated metadata that may be incorporated into the feature sets. These might include, for example, artist label, conventional genre label, artist collaborations, artist home country, artist influences, band members, active timeframe for the artist, lyrics, biographies, ratings, associations with radio playlists, etc. User listening or track consumption behavior of a population of users, or track popularity (e.g., Billboard chart data) may also be incorporated into track feature sets.

Each of a subset of tracks in the catalog (e.g., the "head" of the catalog or the most popular tracks) is assigned a particular theme in a process that involves human curators (404). This initial assignment to themes may be based, for example, on any of user listening behavior, conventional genre labels, association with streaming radio playlists, etc. The assumption is that the data associated with the head tracks are more reliable and verifiable. The themes and feature sets for these head tracks are then used as training data for machine learning by a theme classifier in a process that is supervised (e.g., manually verified) by human curators (406). Once the theme classifier's learning is sufficient, the tracks in the "tail" of the catalog (e.g., the remaining, less popular portion of the catalog), as well as any new tracks added to the catalog, may then be classified by the theme classifier (408). More than one theme may be assigned for a particular track. And as will be discussed, the set of tracks assigned to a particular theme is the set of tracks from which the user's MNS experience is derived for particular seed music.

A class of machine-learning algorithms suitable for accomplishing the assignment of theme is represented by the Adsorption algorithm, a label propagation algorithm originally designed to generate video recommendations across a large library of videos using sparse video consumption data. The Adsorption algorithm takes items with known good labels (e.g., the head tracks), and using connections within the data set, adds labels to other related items (e.g., the tail tracks). For further information regarding the Adsorption algorithm, please refer to *Video Suggestion and Discovery for YouTube: Taking Random Walks Through the View Graph* by Shumeet Baluja et al., WWW 2008, April 21-25, Beijing, China, the entirety of which is incorporated herein by reference for all purposes. According to a particular implementation, the theme classifier assigns themes to each track in the catalog by traversing a bipartite graph constructed with the set of audio features and the unique track identifiers (e.g., proprietary track IDs), with an edge between a feature and each track to which it applies. Each edge has a weighting that is the normalized feature rating for a track, i.e., the weighting represents the degree to which the corresponding track may be characterized by that feature, with the weighting normalized in relation to other tracks sharing that feature (e.g., scaled based on the mean or standard deviation).

According to various implementations, listener behavioral and consumption data may be analyzed to inform connections among tracks in the catalog and among themes. For example, the listening behavior of a population of users might be analyzed with a collaborative filtering algorithm, e.g., an Alternating-Least-Squares with Weighted-λ-Regularization (ALS-WR) algorithm, to identify and/or represent similarities among tracks that were played by the same listeners. Similarly, an item-to-item collaborative filtering approach might be used to do a similar thing based on the purchase behavior of a population of music consumers. In another example, user feedback (e.g., track ratings) may be aggregated over a population of users to inform connections among tracks and/or themes. In yet another example, the way in which users group and/or order tracks may be tracked to do the same.

Such techniques might also employ various statistical techniques to take into account the popularity of particular tracks when identifying connections in the data. For example, a bestselling track is statistically more likely to be purchased often with many other tracks, so it might not be considered similar to another track unless it was purchased with that track significantly more often than would be expected. Such techniques might also account for the amount of time elapsed between purchases and/or weight more recent purchases more heavily. These are merely a few examples of how the behavioral and consumption data of listeners might be used to inform the classification of tracks as described herein. Other alternatives will be apparent to those of skill in the art.

Referring back to FIG. 3, the content selection logic identifies one or more MNS tracks from the catalog for playback immediately following the last track of the seed music (308). As discussed above, playback of the MNS tracks (310) is contemplated as being initiated without requiring input or action by the listener. However, it should be noted that implementations are also contemplated in which the user may be provided with the opportunity to explicitly select or enable the MNS experience by, for example, selection of an MNS interface control (in much the same way a listener might select "shuffle" or "repeat" in connection with selecting a playlist).

The MNS tracks are selected from a set of candidate MNS tracks in the catalog that correspond to the theme(s) of the seed music. According to a particular implementation, a set of MNS tracks (e.g., 4 or 5) is identified for playback based on the original seed music. When playback of that set of MNS tracks nears completion (312), the process is iterated and another set of MNS tracks that fits the theme is identified (308). These iterations continue until terminated, e.g., by the user (314), i.e., the music never stops on its own.

By having learned themes associated with all tracks in the catalog, a set of possible MNS tracks may be identified as soon as a theme is determined for the seed music. However, as alluded to above, it may not be desirable to employ a deterministic approach to selection of MNS tracks in that most users would prefer an experience that appears more random. Therefore, according to a particular implementation, the selection of MNS tracks is controlled to provide the user with a varied but cohesive listening experience.

For example, subsequent iterations of MNS track selection may take into account not only the seed music, but also the MNS music that has been played subsequent to the original seed music. For example, such information may serve to avoid overly repetitious playback (which might include allowing some repetition, e.g., for popular tracks). In addition or as an alternative, tracks played subsequent to the original seed music may be added to or even partially or entirely replace the original seed music as the determinant of the theme. Such an approach might be useful where, for example, the user has provided feedback such as explicit indications of approval or disapproval of such tracks (e.g., by selecting a "thumbs up" or "thumbs down" icon, or by recommending the track to other users). In another example, continuity between consecutive tracks and/or tracks within in a group of tracks may also be ensured with reference to similarities between the extracted features (e.g., the MARSYAS data) of the tracks.

According to a particular class of implementations, when selecting and ordering candidate MNS tracks for playback, a variety of data are taken into account to ensure a positive listening experience. This may be important, for example, to ensure the MNS experience changes on subsequent launches from the same seed music. To achieve this, each candidate MNS track is given a weight, and a weighted shuffle is used to determine the order of the tracks. Further, as MNS tracks are selected, the weight for each candidate track is recalculated. The weighting of a candidate MNS track may be based on any of a number of factors including, for example, the number of shared themes between the candidate track and the seed music; similarities in listener consumption behavior between the candidate track and the seed music; similarities in listener consumption behavior between the candidate track and the last candidate track selected; the length of time or the number of tracks played since the candidate track was chosen; ratings of the candidate track (e.g., for a streaming station which may or may not be related in some way to the seed music). Other possibilities for weighting tracks and adjusting weights will be apparent to those of skill in the art.

To personalize the experience, the particular listener's behavior and/or feedback before and/or during the MNS experience may also affect the weighting or inclusion of the candidate MNS tracks, e.g., positive and negative ratings by the listener. For example, as mentioned above, ratings of tracks delivered during MNS playback may be used to make adjustments to the selection process for subsequent tracks and sessions. If a user skips a track during playback, this also may be taken into account in fine tuning the listener's MNS experience. Recommendation of a track to other users might also be taken into account. The data representing user behavior that are taken into account may correspond to both seed music tracks as well as MNS tracks and may include, for example, the current physical context of the listener (e.g., geographic location, time of day, etc.), the current virtual context of the listener (e.g., web site, mobile app, etc.), listening history, purchase history, the listener's music library (e.g., on the user's device or stored with a remote music service), the listener's browsing history, listener demographic data, etc. For example, the tracks in a user's library and the tracks to which the user has recently listened might be used to inform the inclusion or exclusion of tracks from the MNS experience.

In cases where the seed music is a collection of tracks such as a playlist, the theme for subsequent MNS tracks may be determined in a number of ways. For example, where the individual themes for most or at least the majority of the collection of tracks in the seed music is the same, that theme may be selected for the MNS tracks. However, where there is no clear single theme a number of different approaches could be employed. For example, determination of a theme might be achieved through an understanding of relationships among the various themes represented by the seed music tracks (e.g., as represented by the bipartite graph), e.g., identification of two related themes might lead to identification of a third theme that is more closely related to both than they are to each other. In another example, in cases in which the seed music is extremely diverse, the theme might be selected based on only the last few tracks or even the last track of the seed music.

As mentioned above, the MNS experience may be initiated (e.g., by the client calling the MNS APIs) when the last track of the seed music (or the most recent set of MNS tracks is playing). Before that track has finished playing the first (or next) tracks of the MNS experience are determined so that playback can commence when playback of the current track completes. However, implementations are contemplated in which determination of the next MNS tracks may occur earlier in the process (e.g., upon selection or identification of the seed music or previous set of MNS tracks, or during playback of a track prior to the last track in the previous set). However, it will be understood that such an approach may not be able to adequately account for user interactions that occur during seed music or MNS playback, or might result in a need to recalculate the MNS tracks to take such user interactions into account.

According to a particular implementation, MNS tracks are only selected from among the head tracks of the catalog. That is, because the tail tracks in the catalog are, by definition, not as popular as the head tracks, there are less behavioral and consumption data available for such tracks. Also, the metadata associated with tail tracks tend to be less reliable than the metadata associated with the more popular head tracks. Therefore, in this implementation, while the theme may be identified from seed music from the tail of the catalog (e.g., with heavy reliance on similarities among extracted musical features), the MNS tracks themselves are selected from the head of the catalog because of the higher confidence that a consistent theme may be maintained (i.e., in reliance on the richer and more reliable data set associated with this part of the catalog). However, it should be understood that this limitation does not apply to all implementations that fall within the scope of the invention.

It should be noted that implementations are contemplated in which the number and precision of themes evolve over time. This evolution might reflect the learning and creation of new classifications by the theme classifier based, for example, on improved track metadata, better and/or different musical feature extraction, new tracks being introduced to the catalog, evolving listener behavior and consumption data, etc. As such, delivery of the MNS experience is expected to continue to improve over time.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method, comprising:
receiving a plurality of first identifiers from a client device with one or more computing devices, each of the first identifiers corresponding to one of a plurality of first musical tracks of first musical content selected for playback on the client device, the first identifiers being received during playback of the first musical content on the client device;
using one or more of the computing devices, identifying a theme for the first musical content using first classification data associated with the first musical content, the first classification data being at least partially derived from first musical features extracted from each of the first musical tracks of the first musical content, the theme corresponding to a set of classification labels applied to a set of previously clustered musical tracks;
using one or more of the computing devices, identifying a plurality of second musical tracks of second musical content included in the set of previously clustered musical tracks corresponding to the theme for playback subsequent to playback of the first musical content, identification of the second musical content being achieved using second classification data associated with the second musical content, the second classification data being at least partially derived from second musical features extracted from each of the second musical tracks of the second musical content;
using one or more of the computing devices, retrieving the second musical content from a musical content data store;
using one or more of the computing devices, transmitting the second musical content to the client device; and
automatically initiating playback of the second musical content on the client device without human intervention upon completion of playback of the first musical content.

2. The method of claim 1, wherein identifying the second musical content is further achieved using one or more of (1) behavior of a first user that selected the first musical content for playback in relation to the first or second musical content, (2) behavior of a population of users relating to the first or second musical content, or (3) metadata associated with the first or second musical content.

3. The method of claim 1, further comprising identifying additional musical content corresponding to the theme for playback subsequent to playback of the second musical content, identification of the additional musical content being achieved using additional classification data associated with the additional musical content, the additional classification data being at least partially derived from additional musical features extracted from the additional musical content, the method further comprising repeating identification of the additional musical content until playback is interrupted by a user.

4. The method of claim 3, further comprising receiving user feedback relating to playback of at least some of the second musical content or the additional musical content, wherein repeating identification of the additional musical content is done using the user feedback.

5. A system, comprising one or more computing devices configured to:
receive a first identifier representing first musical content selected for playback, the first identifier being received during playback of the first musical content;
identify a theme for the first musical content using first classification data associated with the first musical content, the first classification data being at least partially derived from first musical features extracted from the first musical content, the theme corresponding to a set of classification labels applied to a set of previously clustered musical tracks;
identify second musical content corresponding to the theme for playback subsequent to playback of the first musical content, identification of the second musical content being achieved using second classification data associated with the second musical content, the second classification data being at least partially derived from second musical features extracted from the second musical content; and automatically initiate playback of the second musical content without human intervention upon completion of playback of the first musical content.

6. The system of claim 5, wherein the one or more computing devices are further configured to identify the second musical content using one or more of (1) behavior of a first user that selected the first musical content for playback in relation to the first or second musical content, (2) behavior of a population of users relating to the first or second musical content, or (3) metadata associated with the first or second musical content.

7. The system of claim 5, wherein the one or more computing devices are further configured to identify additional musical content corresponding to the theme for playback subsequent to playback of the second musical content, identification of the additional musical content being achieved using additional classification data associated with the additional musical content, the additional classification data being at least partially derived from additional musical features extracted from the additional musical content, and wherein the one or more computing devices are further configured to repeat identification of the additional musical content until playback is interrupted by a user.

8. The system of claim 7, wherein the one or more computing devices are further configured to receive user feedback relating to playback of at least some of the second musical content or the additional musical content, and to repeat identification of the additional musical content using the user feedback.

9. The system of claim 8, wherein the user feedback includes skipping a portion of the second musical content or the additional musical content, or rating the second musical content or the additional musical content.

10. The system of claim 5, wherein the first musical content comprises one of a single musical track, a plurality of musical tracks, an album, or a playlist.

11. The system of claim 5, wherein the first musical content and the second musical content are included in a catalog of musical content, and wherein the second musical content is only selected from a subset of most popular musical tracks in the catalog.

12. The system of claim 5, wherein the second classification data are further derived using one or more of track metadata, user listening data, track consumption data, or track popularity data.

13. A client device, comprising one or more processors and memory configured to:
receive a first identifier representing first musical content selected for playback;
initiate playback of the first musical content;
during playback of the first musical content, transmit the first identifier for identification of a theme for the first musical content using first classification data associated with the first musical content, the first classification data being at least partially derived from first musical features extracted from the first musical content, the theme corresponding to a set of classification labels applied to a set of previously clustered musical tracks;
receive second musical content corresponding to the theme for playback subsequent to playback of the first musical content, identification of the second musical content being achieved using second classification data associated with the second musical content, the second classification data being at least partially derived from second musical features extracted from the second musical content; and
automatically initiate playback of the second musical content without human intervention upon completion of playback of the first musical content.

14. The client device of claim 13, wherein the one or more processors and memory are further configured to receive additional musical content corresponding to the theme for playback subsequent to playback of the second musical content, identification of the additional musical content being achieved using additional classification data associated with the additional musical content, the additional classification data being at least partially derived from additional musical features extracted from the additional musical content, and wherein the one or more processors and memory are further configured to continue playback of the additional musical content until interrupted by a user.

15. The client device of claim 14, wherein the one or more processors and memory are further configured to receive user feedback relating to playback of at least some of the second musical content or the additional musical content, and to continue playback of the additional musical content as adjusted using the user feedback.

16. The client device of claim 15, wherein the user feedback includes skipping a portion of the second musical content or the additional musical content, or rating the second musical content or the additional musical content.

17. The client of claim 13, wherein the first musical content comprises one of a single musical track, a plurality of musical tracks, an album, or a playlist.

18. A computer program product, comprising one or more non-transitory computer-readable media having computer program instructions stored therein that are configured such that, when executed by one or more computing devices, the computer program instructions cause the one or more computing devices to:
receive a first identifier representing first musical content selected for playback, the first identifier being received during playback of the first musical content;
identify a theme for the first musical content using first classification data associated with the first musical content, the first classification data being at least partially derived from first musical features extracted from the first musical content, the theme corresponding to a set of classification labels applied to a set of previously clustered musical tracks;
identify second musical content corresponding to the theme for playback subsequent to playback of the first musical content, identification of the second musical content being achieved using second classification data associated with the second musical content, the second classification data being at least partially derived from second musical features extracted from the second musical content; and
automatically initiate playback of the second musical content without human intervention upon completion of playback of the first musical content.

19. The computer program product of claim 18, wherein the computer program instructions are further configured to cause the one or more computing devices to identify the second musical content using one or more of (1) behavior of a first user that selected the first musical content for playback in relation to the first or second musical content, (2) behavior of a population of users relating to the first or second musical content, or (3) metadata associated with the first or second musical content.

20. The computer program product of claim 18, wherein the computer program instructions are further configured to cause the one or more computing devices to identify additional musical content corresponding to the theme for playback subsequent to playback of the second musical content, identification of the additional musical content being achieved using additional classification data associated with the additional musical content, the additional classification data being at least partially derived from additional musical features extracted from the additional musical content, and wherein the computer program instructions are further configured to cause the one or more computing devices to repeat identification of the additional musical content until playback is interrupted by a user.

* * * * *